(12) United States Patent
Stanford et al.

(10) Patent No.: US 8,669,872 B1
(45) Date of Patent: Mar. 11, 2014

(54) ENCAPSULATING COMMANDS FOR RFID TAGS

(75) Inventors: Theron Stanford, Seattle, WA (US); Christopher J. Diorio, Shoreline, WA (US); Harley Heinrich, Snohomish, WA (US)

(73) Assignee: Impinj, Inc., Seattle, WA (US)

( * ) Notice: Subject to any disclaimer, the term of this patent is extended or adjusted under 35 U.S.C. 154(b) by 434 days.

(21) Appl. No.: 13/164,578

(22) Filed: Jun. 20, 2011

Related U.S. Application Data

(63) Continuation-in-part of application No. 12/035,393, filed on Feb. 21, 2008, now Pat. No. 7,999,675.

(60) Provisional application No. 61/357,199, filed on Jun. 20, 2010.

(51) Int. Cl.
*G08B 13/14* (2006.01)

(52) U.S. Cl.
USPC .................. 340/572.1; 340/10.1; 340/505

(58) Field of Classification Search
USPC .......................................... 340/572, 10, 505
See application file for complete search history.

(56) References Cited

U.S. PATENT DOCUMENTS

| | | | |
|---|---|---|---|
| 7,999,675 B2 * | 8/2011 | Diorio et al. | 340/572.1 |
| 2010/0225446 A1 * | 9/2010 | Huang | 340/10.1 |
| 2011/0074552 A1 * | 3/2011 | Norair et al. | 340/10.1 |

* cited by examiner

*Primary Examiner* — Travis Hunnings
(74) *Attorney, Agent, or Firm* — Turk IP Law, LLC

(57) ABSTRACT

Radio Frequency Identification (RFID) tags may receive one or more encapsulated commands within the payload of an encapsulating command. An encapsulated command includes at least a command code and an instruction. A tag may store the encapsulated command(s) or the instruction portion of the encapsulated command(s) for later execution. A sequence of encapsulated commands may be contained within one encapsulating command or spread across multiple encapsulating commands. The sequence of encapsulated commands, or the sequence of instructions associated with the encapsulated commands, may form a program. The tag may execute the instructions or program upon receipt, upon a trigger event, serially or in parallel, and/or may modify the instructions or program by adjusting parameters. The tag may later be told by a reader to execute the instructions or program via another command which, in some cases, may be sent prior to tag singulation.

27 Claims, 15 Drawing Sheets

*RFID SYSTEM*

SIGNAL PATH DURING R→T

SIGNAL PATH DURING T→R

| ITEM | COMMAND | MEMBANK | POINTER | DATA | RN | CRC-16 |
|---|---|---|---|---|---|---|
| # OF BITS | 8 | 2 | EBV | 16 | 16 | 16 |
| DESCR. | 11000011 | 00: Reserved<br>01: EPC<br>10: TID<br>11: User | Address pointer | RN16 XOR word to be written | handle | |

*TABLE 6.35 - WRITE COMMAND OF THE GEN2 SPECIFICATION*

FIG. 7A

| ITEM | COMMAND | TARGET | ACTION | MEMBANK | POINTER | LENGTH | MASK | TRUNCATE | CRC-16 |
|---|---|---|---|---|---|---|---|---|---|
| # OF BITS | 4 | 3 | 3 | 2 | EBV | 8 | VARIABLE | 1 | 16 |
| DESCR. | 1010 | 000: Inventoried (S0)<br>001: Inventoried (S1)<br>010: Inventoried (S2)<br>011: Inventoried (S3)<br>100: SL<br>101: RFU<br>110: RFU<br>111: RFU | See Table 6.18 | 00: RFU<br>01: EPC<br>10: TID<br>11: User | Starting Mask address | Mask length (bits) | Mask value | 0: Disable truncation<br>1: Enable truncation | |

*TABLE 6.19 - SELECT COMMAND OF THE GEN2 SPECIFICATION*

FIG. 7B

|  | Mask | | | | |
|---|---|---|---|---|---|
|  | FEF | | | FCF | |
|  | Subfield_1 | ... | Subfield_N | Command code | Instruction |
| # of bits | Variable | Variable | Variable | 5 | Variable |
| description | -- | -- | -- | -- | -- |

*MASK FIELD OF A SELECT COMMAND*
*REPURPOSED TO ENCAPSULATE A COMMAND*

FIG. 7C

ENCAPSULATING COMMANDS FOR RFID TAGS

CROSS REFERENCE TO RELATED APPLICATIONS

This application claims the benefit of U.S. Provisional Patent Application Ser. No. 61/357,199 filed on Jun. 22, 2010, and is a continuation-in-part (CIP) of co-pending U.S. patent application Ser. No. 12/035,393, filed Feb. 21, 2008, commonly assigned herewith. The disclosures of these patent applications are hereby incorporated by reference for all purposes.

BACKGROUND

Radio Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna and an RFID integrated circuit (IC) including a radio section, a power management section, and frequently a logical section, a memory, or both. In some RFID tags the power management section employs an energy storage device, such as a battery. RFID tags with an energy storage device are known as active or battery-assisted tags. Advances in semiconductor technology have miniaturized the electronics so much that an RFID tag can be powered solely by the RF signal it receives. Such RFID tags do not include an energy storage device such as a battery, and are called passive tags. Regardless of the type, all tags typically store or buffer some energy temporarily in passive storage devices such as capacitors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to enabling an RFID tag to store and/or execute one or more commands encapsulated within the payload of an encapsulating command, where both the encapsulated command(s) and the encapsulating command include at least a command-code portion and an instruction or payload portion. In some embodiments the encapsulating command can be a Select command of the Gen2 Specification (Class-1 Generation-2 UHF RFID Protocol for Communications at 860 MHz—960 MHz by EPCglobal, Inc., version 1.2.0, which is hereby incorporated in its entirety by reference). In other embodiments the encapsulating command can be another command of the Gen2 Specification, or an entirely new command, or a command associated with another standardized or custom communication protocol. Likewise, in some embodiments the encapsulated command(s) can be commands of the Gen2 Specification, or portions of command(s) of the Gen2 Specification, or new commands, or perhaps commands associated with another protocol entirely.

In some embodiments the payload of the encapsulating command contains one or more encapsulated command(s) that the tag stores in memory for later execution. In some embodiments the tag stores only the instruction portion of the encapsulated command(s). The tag may combine the encapsulated command(s), or the instruction portion of the encapsulated command(s), with other commands or instructions already known to or stored in the tag. The encapsulated commands may be contained in a single encapsulating command or spread across multiple encapsulating commands, and the instruction sequence may perform a single operation or multiple operations.

In some embodiments, a tag executes the instruction portion of a command encapsulated in the payload of the encapsulating command upon receipt. If there are multiple encapsulated commands then the tag may execute their instructions serially or in parallel, and may modify the instruction execution based on received and/or stored parameters. In some embodiments, the tag stores the encapsulated commands or the instruction portion of the encapsulated commands for later execution, for example upon receiving a further command or when triggered by a triggering event (such as a button push, a temperature change, a humidity change, a motion, an acceleration, or a myriad of other possible sensor inputs or triggers).

In some embodiments an instruction may implement a functionality of an existing command, such as the write functionality of a Gen2 Specification Write command or the lock functionality of a Gen2 Specification Lock command.

In some embodiments a command known as a run command may instruct a tag to execute one or more programs. The tag may receive the run command prior to being singulated. The run command may include the one or more programs, or may specify one or more programs stored in tag memory, or a mix of both. The tag may have stored a program as a sequence of instructions received in response to a prior encapsulating command, or in response to another command, or may have had the instructions pre-programmed. In some embodiments the instructions of a stored program may include command codes, such as the write-command-code for a Write command, so the tag can easily determine the stored instruction is a write instruction.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIGS. 7A-B are tables illustrating fields of the Write and Select commands of the Gen2 Specification according to embodiments;

FIG. 7C illustrates repurposing the Mask field of the Select command of FIG. 7B for encapsulating another command.

DETAILED DESCRIPTION

Figure 1:
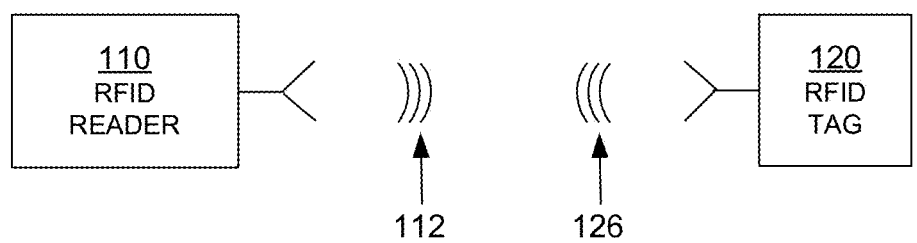
FIG. 1 is a block diagram of components of an RFID system.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, an "instruction" refers to a request to a tag to perform a single explicit action (e.g., write data into memory). A "program" refers to a request to a tag to perform a set or sequence of instructions (e.g., read a value from memory and, if the read value is less than a threshold then lock a memory word). "Programmable" refers to instructions or programs that are changeable or replaceable. A "memory" can be ROM, RAM, SRAM, DRAM, NVM, EEPROM, FLASH, Fuses, FRAM, or other data-storage devices known to those skilled in the art. Some memories, memory types, and memory portions may be writeable and some not. "Singulation" refers to choosing or isolating a single tag from a population of tags through one or more commands transmitted by a reader.

A "command" as used herein refers to a request to a tag to perform one or more actions, and includes one or more instructions preceded by a command code. As one example, "Select" is a command of the Gen2 Specification whose command code is the bit string 1010. A Select command selects a particular tag population based on user-defined criteria, enabling union (U), intersection (∩), and negation (~) based tag partitioning. An encapsulating command is a command that contains or encapsulates one or more other commands in its payload. An encapsulating command may further instruct a tag to execute instructions in tag memory, convey a parameter to a tag, specify an execution order for instructions, tell the tag to store one or more commands or instructions, trigger the execution of one or more instructions, or perform some other custom function. For example, a Custom Select Command is an example of an encapsulating command that is formed by encapsulating one or more other commands within the payload of a Select command of the Gen2 Specification. A run command is a command that indicates one or more programs for a tag to execute, either immediately or upon some trigger event. An encapsulating command may also be a run command, and vice-versa. Further, a run command may also be a Custom Select Command based on the Select command of the Gen2 Specification.

Finally, a "Query" is a command of the Gen2 Specification that initiates an inventory round in which a reader singulates tags and one-at-a-time receives their EPCs. A reader terminates the inventory round by either sending a subsequent Query command (which also starts a new inventory round) or a Select command. After starting an inventory round, a reader may alternatively send QueryAdjust and QueryRep commands, which are variants of the Query command, to continue singulating tags. While the Query/QueryAdj/QueryRep commands are specific to the Gen2 Specification, other "Query-like" commands for tag singulation (e.g., as may be introduced by the EPCglobal or other standards bodies or even proprietary protocols) may perform the same or analogous functions.

FIG. 1 is a diagram of components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the symbols are processed internally by reader 110 and tag 120, they can be equivalently considered and treated as numbers having corresponding values, and so on.

Tag 120 can be a passive tag, or an active or battery-assisted tag (i.e., having its own power source). Where tag 120 is a passive tag, it is powered from wave 112.

Figure 2:
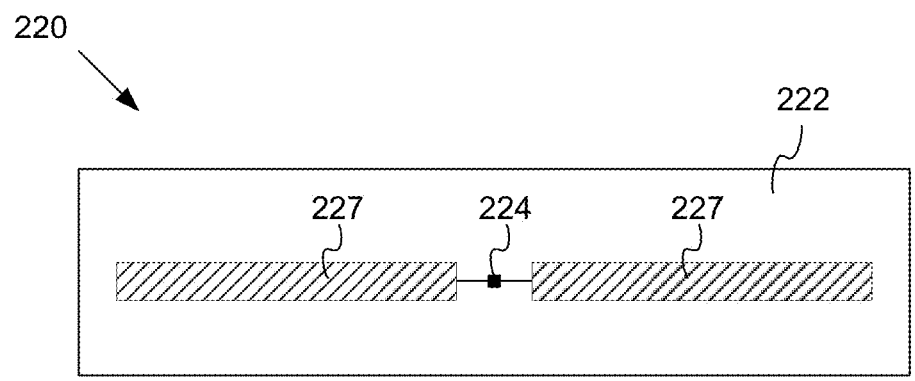
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active and battery-assisted tags.

Tag 220 is formed on a substantially planar inlay 222, which can be made in many ways known in the art. Tag 220 includes an electrical circuit which is preferably implemented as an integrated circuit (IC) 224 (also referred to as chip). IC 224 is arranged on inlay 222.

Tag 220 also includes an antenna for exchanging wireless signals with its environment. The antenna is usually flat and formed on inlay 222. IC 224 is electrically coupled to the antenna via suitable antenna connections (not shown in FIG. 2).

The antenna may be made in a number of ways. In the example of FIG. 2, the antenna is made from two distinct antenna segments 227, which are shown here forming a dipole. Many other embodiments are possible, using any number of antenna segments. In some embodiments, an antenna can be made with even a single segment. Different points of the segment can be coupled to one or more of the antenna connections of IC 224. For example, the antenna can form a single loop, with its ends coupled to the terminals. It should be remembered that, when the single segment has more complex shapes, even a single segment could behave like multiple segments at the frequencies of RFID wireless communication.

In operation, a signal is received by the antenna and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna connections of IC 224 can modulate the antenna's reflectance, as can a variety of other means.

In the embodiment of FIG. 2, antenna segments 227 are separate from IC 224. In other embodiments, antenna segments may alternatively be formed on IC 224, and so on. Furthermore, an interface element may be used to couple the IC 224 to the antenna segments 227 (not shown in FIG. 2).

The components of the RFID system of FIG. 1 may communicate with each other in any number of modes. One such mode is called full duplex. Another such mode is called half-duplex, and is described below.

Figure 3:
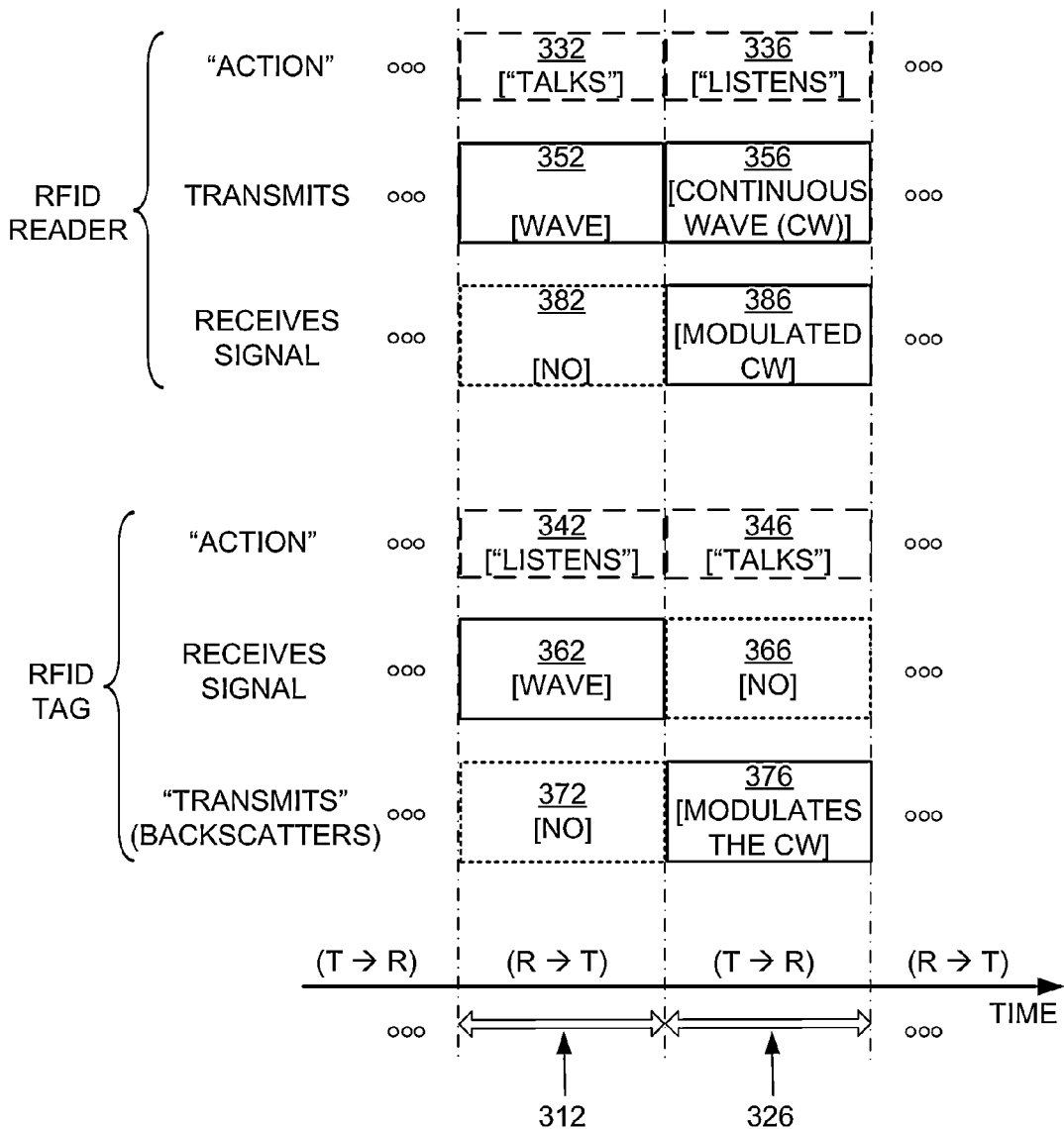
FIG. 3 is a conceptual diagram of communication in an RFID system, for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
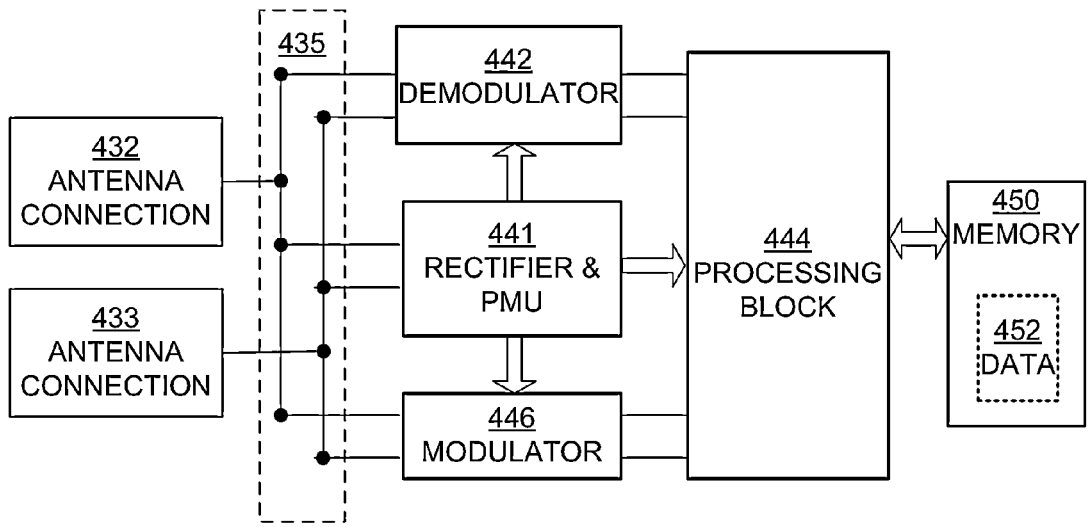
FIG. 4 is a block diagram showing RFID tag components, such as for the tag shown in FIG. 1.

FIG. 4 is a block diagram showing a detail of an RFID IC, such as the one shown in FIG. 2. Electrical circuit 424 in FIG. 4 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 includes at least two antenna connections 432, 433, which are suitable for coupling to one or more antenna segments (not shown in FIG. 4). Antenna connections 432, 433 may be made in any suitable way, such as using pads, bumps, and so on. In a number of embodiments more than two antenna connections are used, especially in embodiments where more antenna segments are used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Rectifier and PMU (Power Management Unit) 441. Rectifier and PMU 441 may be implemented in any way known in the art, for harvesting raw RF energy received via antenna connections 432, 433. In some embodiments, block 441 may include more than one rectifier.

In operation, an RF wave received via antenna connections 432, 433 is received by Rectifier and PMU 441, which in turn generates power for the electrical circuits of IC 424. This is true for either or both reader-to-tag (R→T) and tag-to-reader (T→R) sessions, whether or not the received RF wave is modulated.

Circuit 424 additionally includes a demodulator 442. Demodulator 442 demodulates an RF signal received via antenna connections 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

In terms of processing a signal, circuit 424 operates differently during a R→T session and a T→R session. The different operations are described below, in this case with circuit 424 representing an IC of an RFID tag.

Figure 5A:
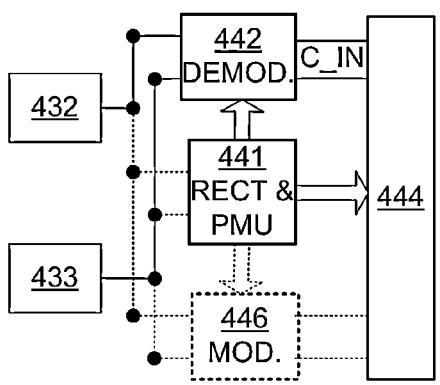
FIGS. 5A and 5B illustrate signal paths during reader-to-tag and tag-to-reader communications in the block diagram of FIG. 4.

FIG. 5A shows version 524-A of components of circuit 424 of FIG. 4, further modified to emphasize a signal operation during a R→T session (receive mode of operation) during time interval 312 of FIG. 3. An RF wave is received by antenna connections 432, 433; a signal is demodulated by demodulator 442; and the demodulated signal is input to processing block 444 as C_IN. In one embodiment, C_IN may include a received stream of symbols.

Version 524-A shows as relatively obscured those components that do not play a part in processing a signal during a R→T session. Indeed, Rectifier and PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
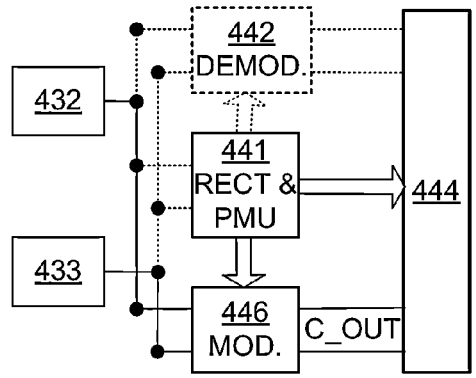

FIG. 5B shows version 524-B of components of circuit 424 of FIG. 4, further modified to emphasize a signal operation during a T→R session during time interval 326 of FIG. 3. A signal is output from processing block 444 as C_OUT. In one embodiment, C_OUT may include a stream of symbols for transmission. C_OUT is then modulated by modulator 446, and output as an RF wave via antenna connections 432, 433.

Version 524-B shows as relatively obscured those components that do not play a part in processing a signal during a T→R session. Indeed, Rectifier and PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

The same advances in semiconductor technology that have enabled a tag to be powered by an incoming RF signal also enable a tag to perform complex operations, such as determining whether the temperature or acceleration the tag is experiencing can damage the object to which the tag is attached. The tag typically performs such a complex operation by executing a sequence of instructions. It would be advantageous for a reader to be able to tell a population of tags to perform a sequence of instructions and then respond, or not respond, or perform some operation, based on the result.

However, in today's tags that conform to the Gen2 Specification, a reader cannot cause tags in a population to simultaneously execute an instruction sequence. Instead, the reader must first singulate (choose or isolate) a tag, and then send successive commands to the singulated tag to execute the instruction sequence, one command (i.e. one instruction) at a time. The reader then singulates another tag and sends the same successive commands.

For m tags and n operations, the above process requires the reader to perform m singulations and send m×n commands. The process can be slow and time consuming, because the reader must interact with each tag serially and must send each instruction to a tag one command at a time, and does not allow a reader to tell a population of tags to collectively execute a sequence of instructions in parallel. For readers with limited power sources or situations where time is limited (e.g., tags moving past the reader), this repetitive process may not even be practical. Furthermore, the process does not allow a reader to first tell the tags to perform a sequence of instructions and then decide whether to participate in subsequent communications with the reader based on a result of the instructions.

In embodiments described herein, a reader may address these issues by encapsulating one or more instructions in the payload of an encapsulating command. A tag, upon receiving an encapsulating command, may execute the encapsulated instructions, store the encapsulated instructions for later execution, or both. In some instances the encapsulating command may instruct a receiving tag to execute one or more instructions that are stored in tag memory, or to execute a combination of sent and stored instructions. In the case of multiple instructions, the encapsulating command may also be known as a run command and the multiple instructions as a program. Each encapsulated instruction may itself be a command, such as a write command that instructs a tag to write data to memory that a reader is able to send to a singulated tag but instead chooses to encapsulate within an encapsulating command. A reader may broadcast the encapsulating command to multiple tags simultaneously before beginning an inventory round. Thus, multiple tags can execute instruction sequences in parallel, which is faster than serially singulating and then serially instructing tags. The tag may, based on a result of the executed instruction(s) or program(s), determine whether to participate in a subsequent inventory round, modify a behavior during a subsequent inventory round, or store a result in a tag memory.

An encapsulating command according to some embodiments may contain parameters that specify how a tag should execute encapsulated and/or stored instructions. For example, an encapsulating command may modify the execution order of stored instructions. When a tag receives the encapsulating command it executes the stored instructions in the modified order. In some embodiments, the tag may store the parameters. The encapsulating command may include indicators to those stored parameter(s), or the tag may itself determine when to apply the stored parameters.

Figure 6:
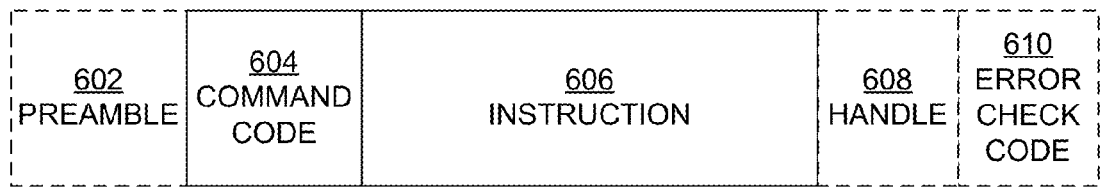
FIG. 6 depicts the structure of a regular command, an encapsulating command, and an encapsulated command according to embodiments.
Figure 6:
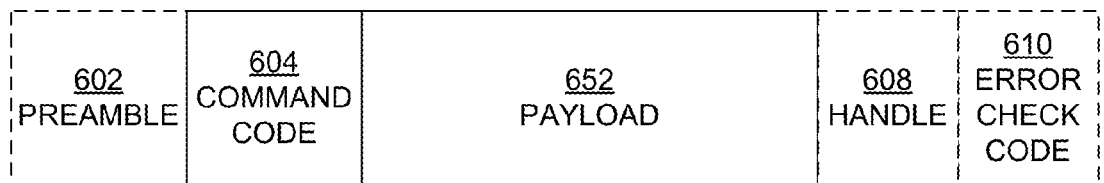
Figure 6:
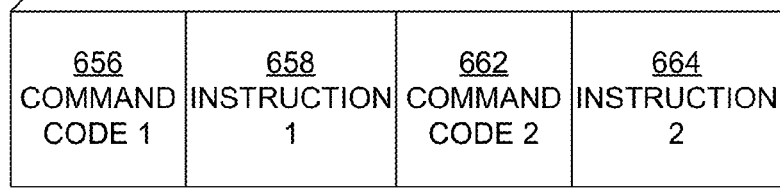

FIG. 6 depicts a typical structure for a regular command 600 and an encapsulating command 650 according to embodiments.

Regular command 600 includes an optional preamble 602, a command code 604, an instruction 606, an optional handle 608, and an optional error-check code 610. Preamble 602 typically provides, among other things, an easily detected shape that facilitates reader-to-tag communications. Command code 604 denotes the command type, and instruction 606 contains the information necessary to execute the command. Handle 608 is a numerical handle that allows the reader to specify the particular tag, and error-check code 610 allows the tag to check the command for errors. Each of these fields is described in more detail in the Gen2 Specification. Examples of Gen2 Specification Write and Select commands and their fields are shown in FIGS. 7A-B.

The encapsulating command 650 also has an optional preamble 602, a command code 604, an optional handle 608, and an optional error-check code 610, each of which are similar to the corresponding fields of the regular command 600. However, in place of the instruction 606 the encapsulating command 650 has a payload 652, which encapsulates one or more other commands. For example, in FIG. 6, the payload 652 includes a first command 654 and a second command 660. The first command 654 includes command code 1 (656) and instruction 1 (658), while the second command 660 includes command code 2 (662) and instruction 2 (664). In some embodiments, payload 652 may indicate one or more instructions or programs stored in tag memory, for example by means of memory pointers to those instructions or programs. Commands in the payload 652 may specify or constitute one or more programs. Optionally, the payload 652 may also include one or more parameters associated with the execution of the encapsulating command 650 itself or of one or more of the commands in or indicated by the payload.

In some embodiments, at least part of the payload or the encapsulating command itself may be encrypted, electronically signed, combined with a message authentication code which authenticates the part of the payload or command that is encrypted, or otherwise secured, via a symmetric or asymmetric cryptographic algorithm or any other cryptographic scheme. In some embodiments an encapsulating command or an encapsulated instruction may include a message count parameter. In these embodiments, each message between a tag and a reader has an associated message count. As messages are passed, the message count included with each message increments sequentially (or in some other manner known to the reader and tag). An unexpected message count (e.g., a tag expects a message count of 4 but sees a message count of 5, or receives two messages, each with a message count of 4) may indicate that a rogue reader is attempting to insert itself into the communications.

As mentioned above, the normal Select command and the Write command of the Gen2 Specification provides examples of how a command carries an instruction. FIG. 7A shows a Write command whose command code is 11000011. The Membank, Pointer, and Data fields comprise the instruction, and instruct a tag to write Data at the address specified by Pointer in the memory bank specified by Membank. The command also contains a 16-bit handle and a 16-bit CRC for error checking. FIG. 7B shows a Select command of the Gen2 Specification that selects a subpopulation of tags for subsequent inventory, as described above.

FIG. 7C shows how the Mask field of the Select command of the Gen2 Specification may be repurposed to encapsulate another command. In the depicted embodiment, the Mask field may be subdivided into two primary subfields: a Feature Enabling Field (FEF) and a Feature Command Field (FCF). Upon receiving a Select command, a tag evaluates the FEF fields to determine whether the Select command is a normal Select command or is an encapsulating Select command. If the Select command is an encapsulating Select command then the tag interprets the FCF according to FIG. 7C in which the leading 5 bits specify a command code and the trailing bits may contain instructions, parameters for instructions, memory pointers to instructions, fields indicating programs, memory pointers to programs, or any combination of these items. In general, an encapsulating Select may include a command, activate instructions on the tag, pass a parameter for one or more instructions, and/or pass an address pointer to the location of instructions. Embodiments are not limited to using an FEF and a FCF, but may include fewer or more fields, or alternative field arrangements, that allow encapsulating one or more commands inside another.

Figure 8:
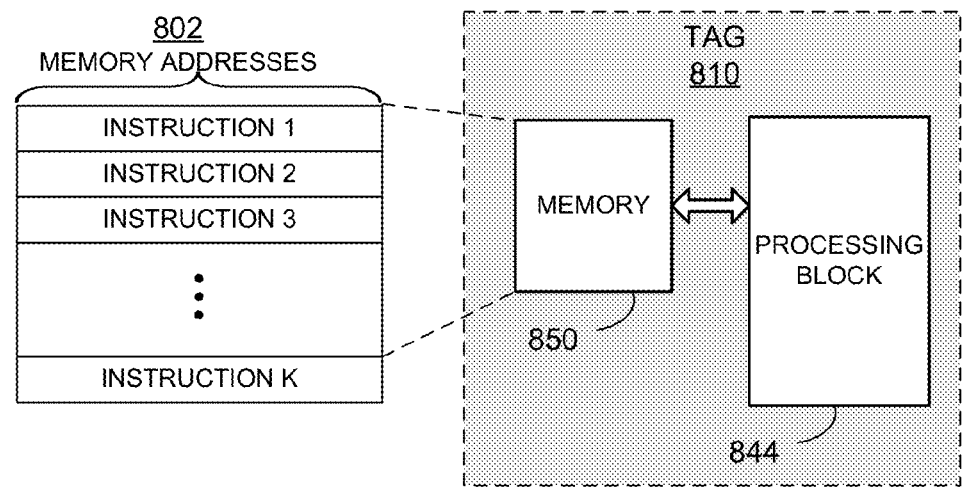
FIG. 8 illustrates how a tag may store received instructions and/or results of executed instructions in memory.
Figure 8:
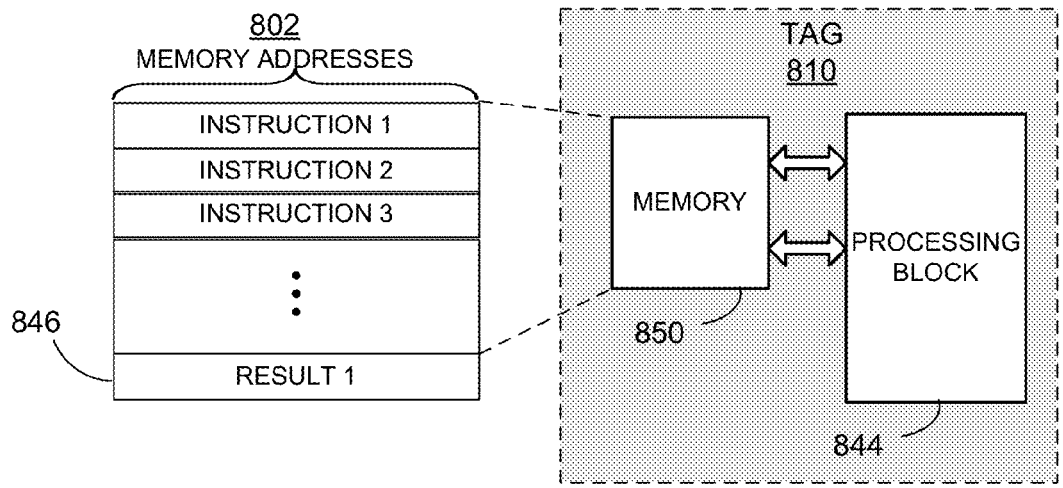

FIG. 8 illustrates how an example tag may store received instructions, sequences of instructions (programs), and/or results of performed instructions or programs in its memory.

According to some embodiments, instructions 1 through k received in an encapsulating or run command may be stored in memory addresses 802 of tag memory 850. Processing block 844 of tag 810 may store and/or execute those instructions upon reception. According to other embodiments, the command may include indicators of memory addresses/locations in tag memory 850 where instructions are already stored. In these cases, processing block 844 may retrieve and execute the stored instructions based on the indicators in the received command.

In some embodiments, the tag may modify the instruction order based on parameters included in the encapsulating or run command, based on pre-programmed instructions in tag memory 850, and/or based on one or more results of executing at least a portion of the instructions. Processing block 844 may store these results (e.g., 846) in tag memory 850.

Figure 9:
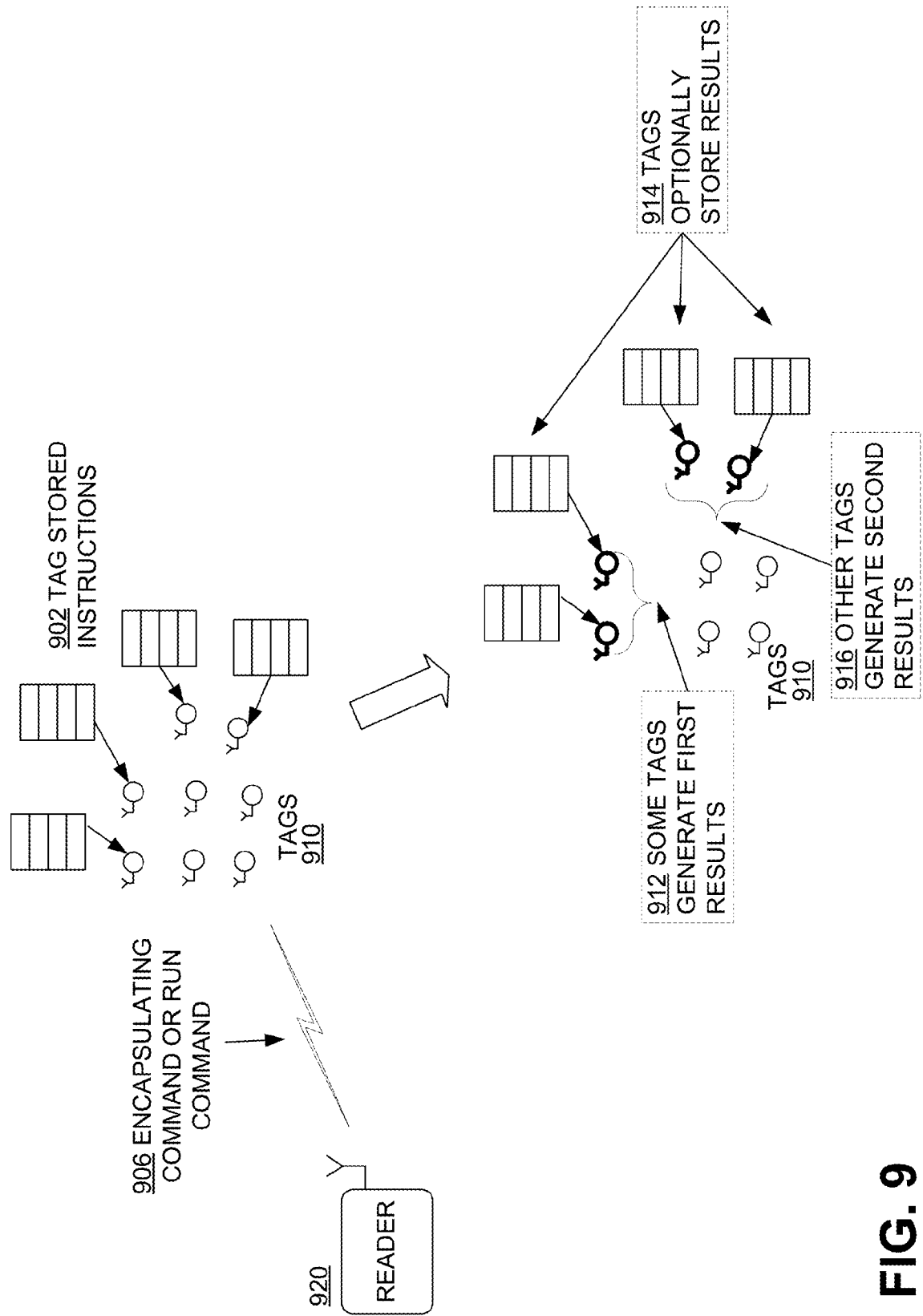
FIG. 9 is a conceptual diagram illustrating tags generating results in response to a reader sending an encapsulating command or a run command according to further embodiments.

FIG. 9 depicts an example scenario illustrating tags generating results in response to an encapsulating or run command according to embodiments. In this example, reader 920 may send an encapsulating or run command 906 to tags 910 and cause the tags to store instruction(s) 902 in their memories. In response to a subsequent command or a trigger event, as discussed below, the tags 910 may perform operations based on the stored instructions and generate results.

In some embodiments, a tag may execute the instructions serially or sequentially. In other embodiments a tag may execute the instructions in parallel. The instructions may also be modified by one or more parameters. Thus, some tags may generate first results 912 in response to the command/trigger event, while other tags in the same group generate second, different results 916 in response to the same command/trigger event. Some or all of the tags may optionally store the generated results in their memory (914). The difference in results may arise due to differences in the tags or in their stored memory values or external (such as sensor) data, in different modification of parameters associated with the stored instructions, or differences in instruction execution order.

For example, some tags may be programmed at manufacture to use default values for certain parameters (or to execute instructions according to a default order). These tags may perform the same operations as other tags but perform the actual instructions in the operations using different parameter values and/or in different orders/sequences, thus generating different results. Because a tag's behavior (e.g., whether it responds to a reader command, whether it participates in an inventory round, how it operates during an inventory round, whether it stores a particular result, etc.) is affected by the results of its executed instructions/programs, differing tag parameters in a population of otherwise similar tags can lead to divergent tag behavior.

Figure 10:
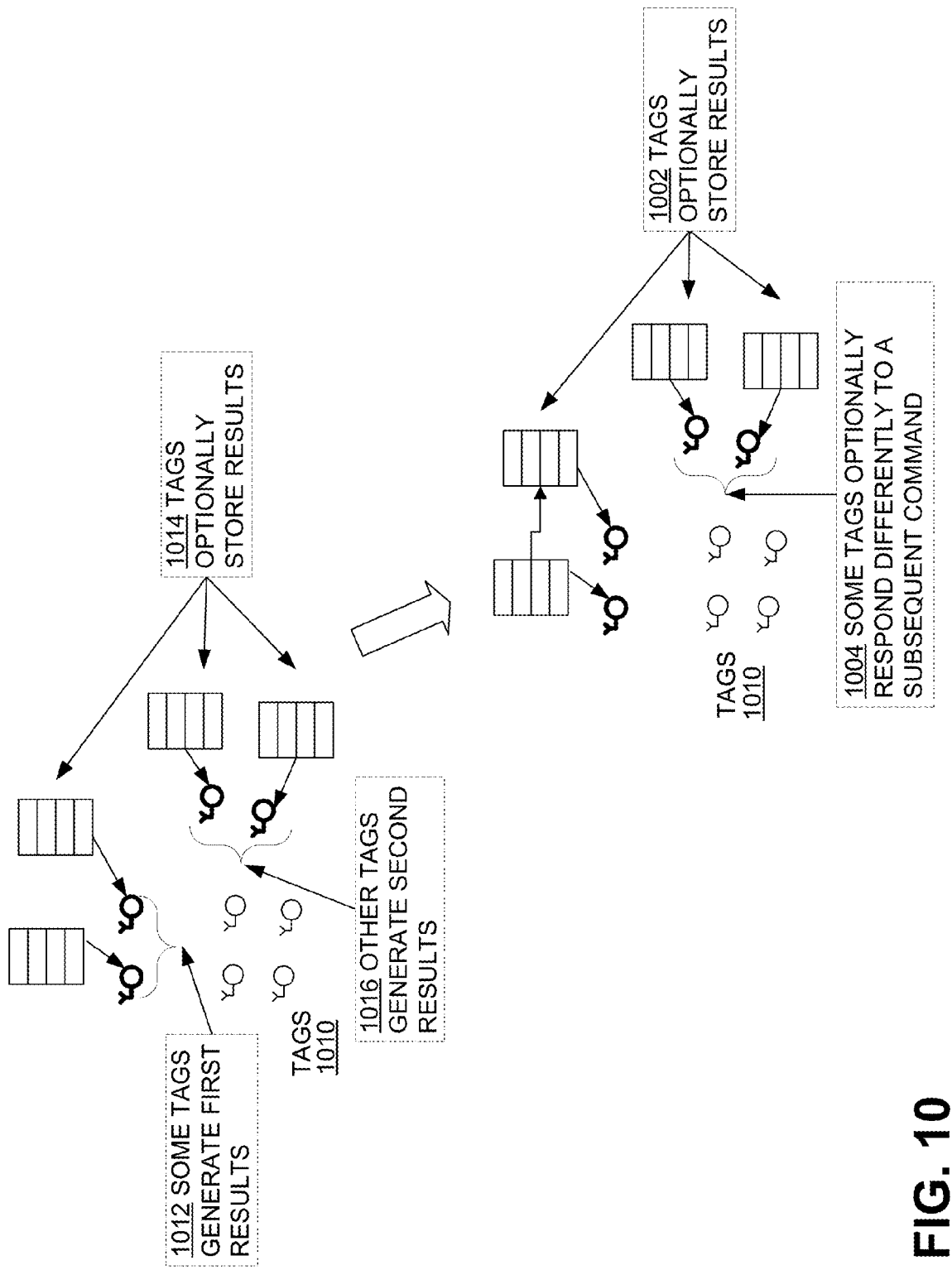
FIG. 10 is a conceptual diagram illustrating tags generating different results in response to a reader sending an encapsulating or run command and optionally responding differently to a subsequent reader command based on the generated results according to some embodiments.

FIG. 10 is a conceptual diagram illustrating tags generating different results in response to a reader command and optionally behaving differently to a subsequent reader command based on the generated results, according to some embodiments.

As described in connection with FIG. 9, although a group of tags may receive the same instructions from a reader, some tags in the group may generate first results 1012, while other tags in the same group may generate second, different results 1016, with the tags optionally storing the generated results (1014). Subsequently, the group of tags may receive an encapsulating, run, or other command from the reader, or a Query or Query-like command that may cause the tags to respond to the reader. In some embodiments, some tags in the group may respond to the reader with different behavior (1004) than other tags in the group. For example, tags may receive a selection command from a reader selecting tags for an inventory round, and may determine whether they participate in that inventory round by comparing stored results 1012, 1014, and/or 1016 with one or more fields in the selection command.

As an example scenario, consider a situation in which a reader is located in a temperature-controlled storage facility and monitoring the temperature of stored items. The reader is tasked with detecting items whose temperatures are outside a prescribed range. Each item is affixed with a tag with a temperature transducer. The reader issues an encapsulating or run command to the tags telling the tags to perform a temperature measurement, compare the measured temperature value to a threshold, and store the result in memory. The reader may then perform a subsequent inventory round, selecting only tags whose measured temperature values exceed the threshold. The reader may perform this selection by transmitting a Select command of the Gen2 Specification with a particular value in its Mask field, where the value matches the stored result of a tag whose measured temperature value exceeds the threshold. In response, only tags whose stored result matches the Mask field value (and therefore whose measured temperature values exceeded the threshold) will participate in the inventory round. Thus, the reader can identify tags (and items) whose temperatures are outside the prescribed range.

Figure 11:
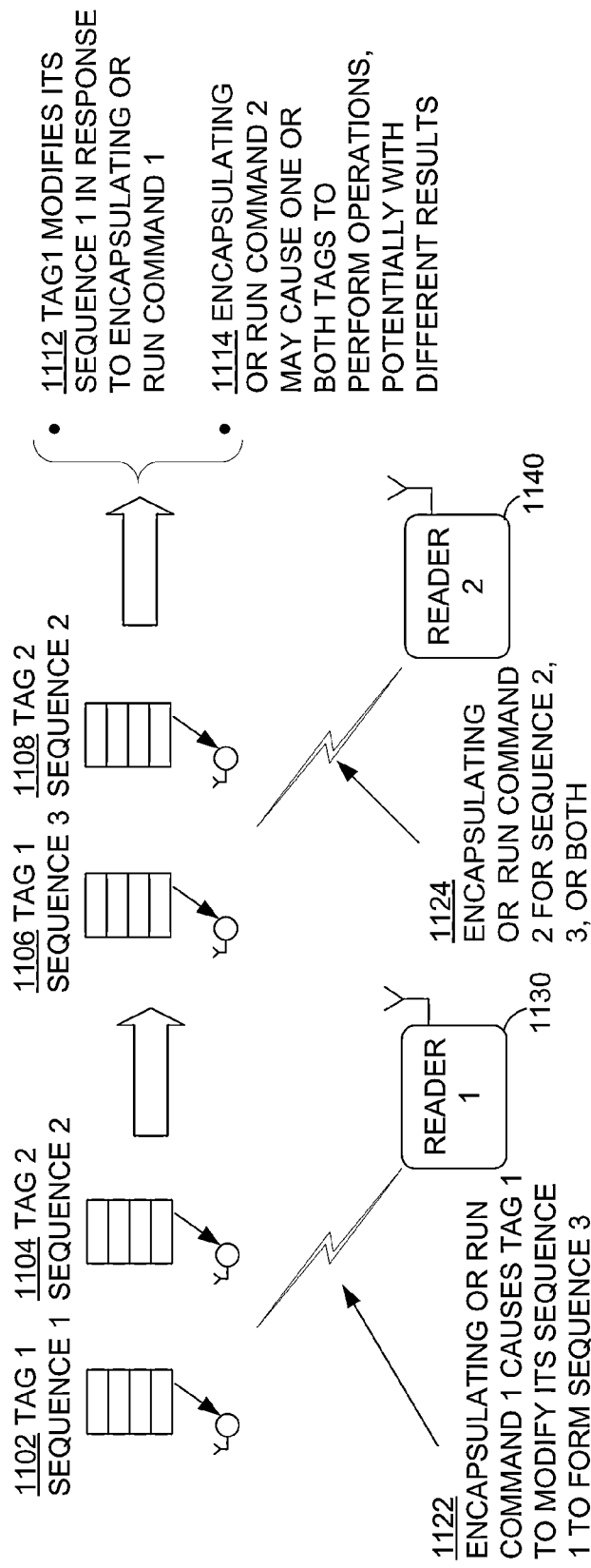
FIG. 11 is a conceptual diagram illustrating example tags modifying sequences of instructions stored in tag memory in response to a reader sending an encapsulating or run command according to embodiments.

FIG. 11 is a conceptual diagram illustrating tags modifying a sequence of instructions stored in tag memory in response to an encapsulating or run command according to some embodiments.

In some example implementations, the arrangement of a sequence of instructions stored in tag memory at manufacturing or in response to a command from a reader may be modified by subsequent command(s) from readers, causing the tags to behave differently and perform operations with potentially different results. For example, as shown in FIG. 11, instructions are stored in tag 1 with a first sequence (sequence 1, 1102), whereas instructions are stored in tag 2 with a second, different sequence (sequence 2, 1104). While the individual instructions stored in each tag may be the same, the differences in instruction sequence may cause the tags to generate different results upon instruction execution.

A first encapsulating or run command 1122 transmitted by reader 1130 causes tag 1 to modify the sequence of its instructions from sequence 1 to a new sequence (sequence 3), while leaving tag 2 (and its instruction sequence) unaffected. Thus, after the first command 1122, tag 1 now has instructions in a sequence 3 (1106) while tag 2 still has instructions in sequence 2 (1108). Subsequently, another reader 1140 transmits a second command 1124 that causes tags with instruction sequences 2, 3, or both to execute their stored instruction according to their respective sequences. Tag 2, with instruction sequence 2, performs its instructions in sequence 2 upon receiving command 1124. Tag 1, which originally had its instruction sequence in sequence 1, also performs its instructions upon receiving command 1124, but in sequence 3 instead of 1, because its instruction sequence was changed by the first command (1112). However, while the second command causes both tags to execute stored instructions/programs, the differences in executed instruction sequence may lead to different results for each tag (1114). One or both tags may also store the generated results in their memories, and the reader may select tags based on the generated and stored results. In some embodiments, the programs may be a priori known programs, in which case the command(s) do not have to designate a memory location.

Figure 12:
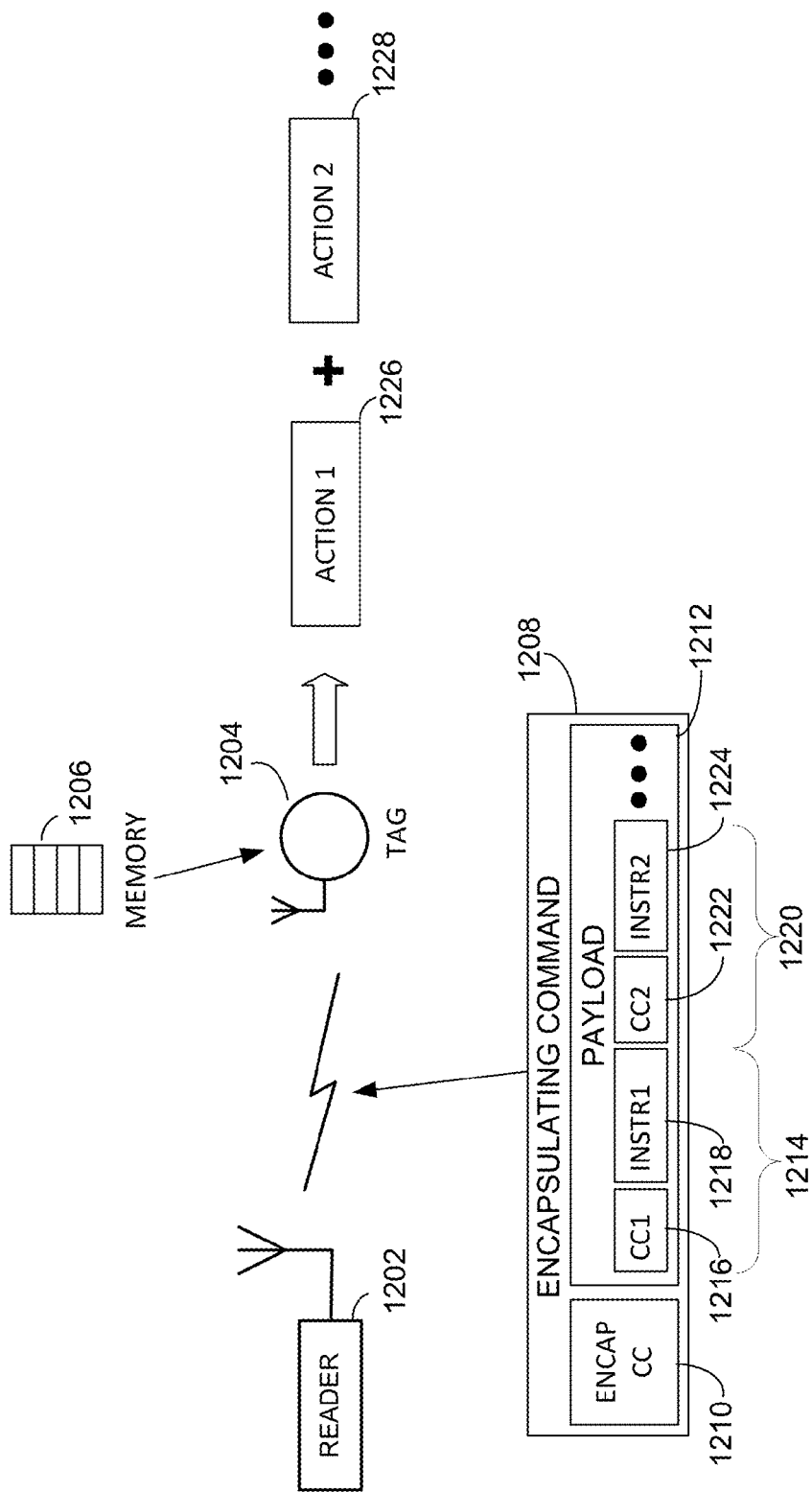
FIG. 12 illustrates an example tag performing actions in response to receiving an encapsulating command containing instructions according to embodiments.

FIG. 12 depicts a tag storing instructions in its memory in response to a reader command according to some embodiments. In this example scenario, reader 1202 transmits an encapsulating command 1208, either before or after singulating the tag. The encapsulating command 1208 includes an encapsulating command code 1210 and a payload 1212. The encapsulating command code 1210 indicates the encapsulating command itself. For example, if the encapsulating command 1208 is a Select command then the command code 1210 would indicate that the encapsulating command 1208 is a Select. The payload 1212 includes one or more commands. Although FIG. 12 depicts payload 1212 as containing two commands (1214 and 1220), it should be understood that payload 1212 may contain more or fewer commands. Each command includes an associated command code (CC) and at least one instruction (INST), and may also include one or more parameters associated with the command. In some embodiments, the payload 1212 may include one or more programs.

Tag 1204, upon receiving the encapsulating command 1208, optionally stores the encapsulated instructions 1218 and 1224 in memory 1206. In some embodiments, the tag stores the included instructions and their associated command codes 1216 and 1222 in tag memory, ordered as they were received in the payload 1212. Optionally, the tag may strip the command codes from one or more of the included commands before storage, and/or may store the included instructions in a different order. The tag can combine the received instructions with instruction(s) already stored in the tag memory 1206 to form one or more programs. The tag can also combine the received instructions with programs already known by or stored in the tag. In some embodiments, commands or programs may be contained in one encapsulating command, or spread across multiple encapsulating commands. Upon receiving the encapsulating command 1208, tag 1204 may or may not transmit a reply to the reader.

The tag may then execute instructions 1218 and 1224, resulting in corresponding actions 1 (1226) and 2 (1228). The tag may execute the instructions either immediately upon receiving the encapsulating command 1208, upon receiving another command, or upon a trigger event. The trigger event may include, but is not limited to, a sensor or user interface input (e.g., if a sensor input is above a threshold, below a threshold, or within a particular range, where the threshold and/or range can be predefined or dynamically determined, or can be a binary event such as a button push or switch actuation), a tag power condition (e.g., a tag power down, such as when a passive tag moves out of range of a reader, an active tag detects low power, a tag receives a command to power-down; a tag power up, such as when a passive tag moves into range of a reader; or when a tag detects a particular power level), or expiration of a tag timer (i.e., a timer located on a tag).

Embodiments also include methods. Some are methods performed by an RFID tag. These methods can be implemented in any number of ways, including using the structures described in this document. One such way is by machine operations, of devices of the type described in this document. Another way is for one or more of the individual operations to be performed by one or more human operators. These human operators need not be collocated with each other, but each can be with a machine that performs a portion of a program or operation.

Figure 13:
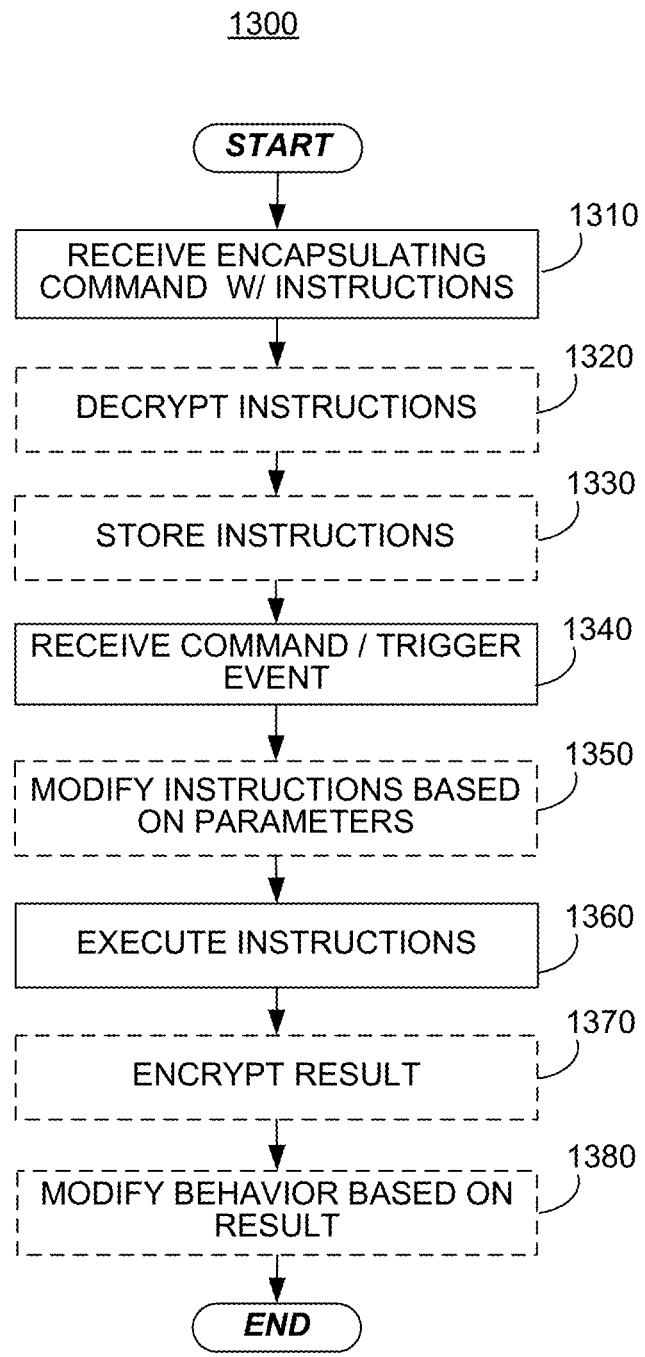
FIG. 13 is a flowchart illustrating an example method of tag instruction execution according to some embodiments.

FIG. 13 is a flowchart illustrating an example method of tag instruction storage according to some embodiments. The example method begins with step 1310, where the tag receives an encapsulating command including one or more encapsulated commands from a reader, where the encapsulated commands include command codes and instructions. The tag may or may not transmit a reply to the reader in response to receiving the encapsulating command. In optional step 1320, the tag decrypts the instructions included in the encapsulating command if they are encrypted. The tag then optionally stores the instructions in optional step 1330 for later execution. The tag may store the instructions according to the order they are received from the reader or in a different order. Furthermore, the order of the stored instructions may be modified subsequently in response to another received command or a trigger event, such as those described above in relation to FIG. 12.

In step 1340, the tag receives a subsequent command, which may be the same encapsulating command that carried the original instructions. Alternatively the tag may receive a trigger event, such as those as described above in relation to FIG. 12. At optional step 1350, the tag modifies the instructions according to one or more parameters, either also received or already stored on the tag, and then executes the instructions (in the order they are received or in a modified order) at step 1360 in response to the received command or trigger event. The tag may optionally encrypt one or more results of the execution of the instructions at optional step 1370, and in some embodiments may store the results (encrypted or not) and/or transmit the results to a reader.

Finally, the tag may modify one or more of its behaviors at optional step 1380 based on the result(s) of the execution of the instructions. For example, the tag may determine whether to participate in a subsequent inventory round, modify a behavior during a subsequent inventory round, or store a result in a tag memory. By providing the ability to execute received instructions, commands, and/or programs, a tag is enabled to perform custom operations after manufacturing. The individual instructions, commands, and/or programs may be programmed at the time of manufacturing or at a later date. For reasons of clarity, the flowchart of FIG. 13 specifies instructions, but as described in embodiments above these instructions could include or be accompanied by command codes and could alternatively be commands.

Figure 14:
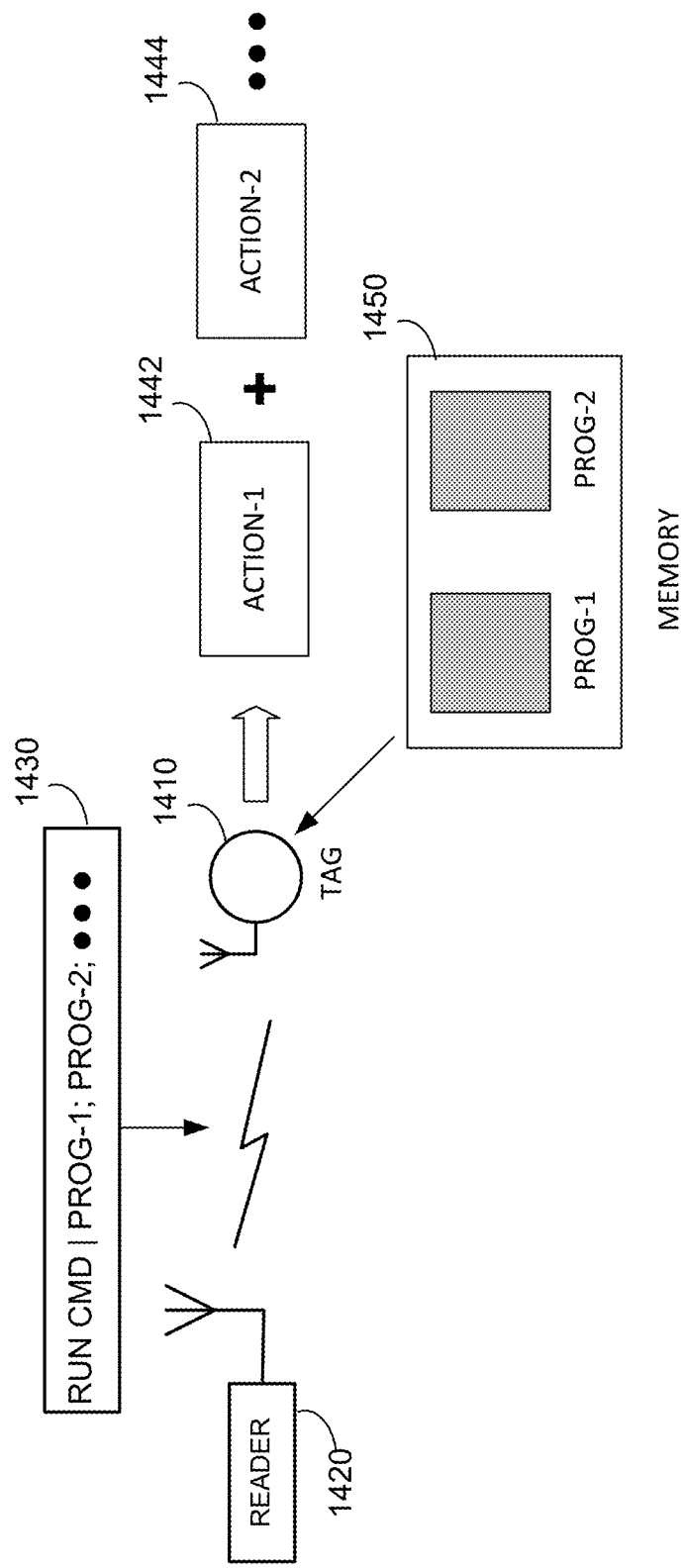
FIG. 14 illustrates an example tag executing multiple, stored programs in response to receiving a run command from a reader prior to the tag being singulated according to embodiments.

FIG. 14 illustrates an example of a tag executing multiple, stored programs in response to receiving a run command from a reader prior to the tag being singulated. In this example, reader 1420 transmits a run command 1430, which includes in its payload indication(s) for programs corresponding to actions 1 (1442) and 2 (1444), and possibly other programs stored in memory 1450 of tag 1410. Tag 1410 may or may not transmit a reply to the reader in response to receiving the run command 1430. Tag 1410 retrieves the stored programs from its memory 1450 upon receiving the run command 1430 and executes them in the order indicated by the run command 1430. Alternatively, the execution order of the programs may be based on one or more parameters included in the run command 1430 (e.g. a conditional parameter), a pre-programmed instruction in the tag, a result of executing the first program, or any other condition.

An RFID tag may store any number of programs in its memory. In some embodiments, a reader may transmit a command indicating two or more of those programs in a specified order and cause the tag to execute the indicated programs in the specified order. Not all stored programs have to be executed each time and not in the order of storage. Of course a tag may be commanded to perform any other combinations of serial or parallel execution of any number of programs with one or more run commands prior to singulation of the tag.

Figure 15:
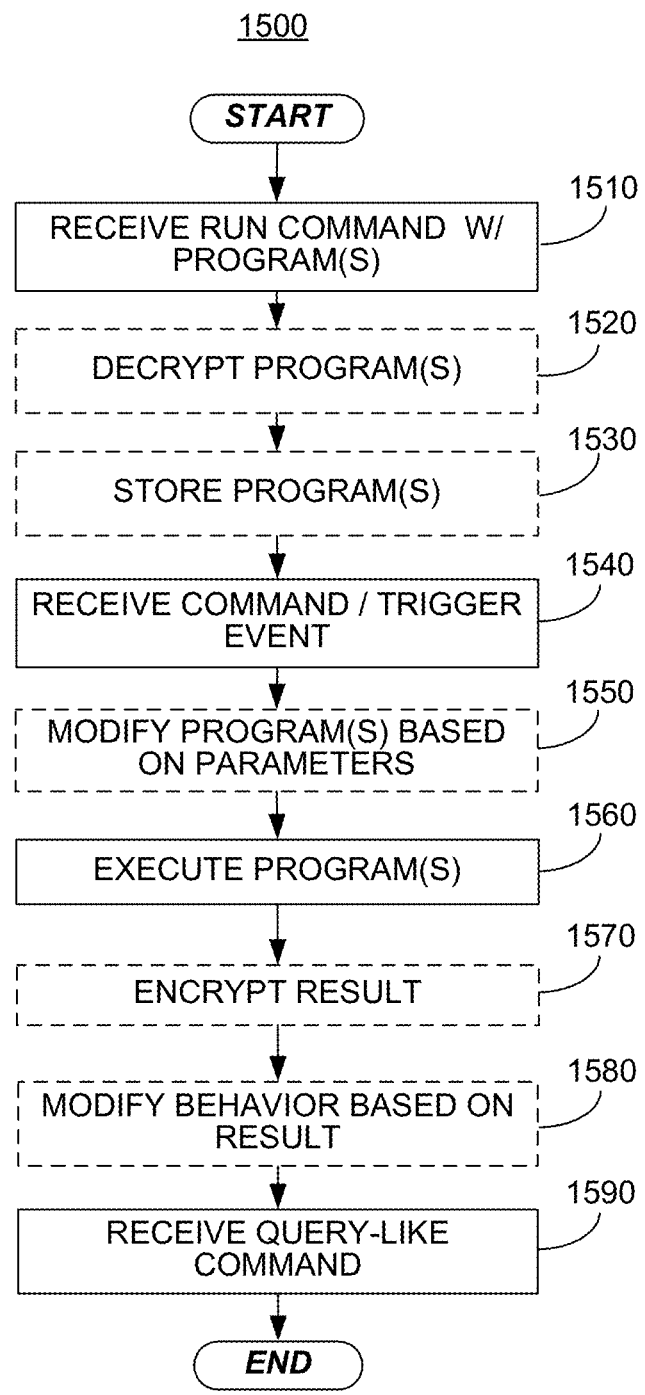
FIG. 15 is a flowchart illustrating an example method of tag execution of a run command including program(s), according to certain embodiments.

FIG. 15 depicts an example method of tag execution of a run command prior to singulation, including one or more programs, according to certain embodiments. The method begins with step 1510, in which the tag receives a run command including one or more programs for the tag to execute. For example, the run command may be similar to encapsulating command 650, depicted in FIG. 6, and may contain one or more programs in its payload. The tag may or may not transmit a reply to the reader in response to receiving the run command.

If the program(s) in the run command are encrypted, the tag (or a processor of the tag) may decrypt the program(s) at optional step 1520. In some embodiments, the tag may store the program(s) included in the run command in a tag memory (step 1530). The tag may determine whether to store the program(s) based on the received run command, a previously received command, and/or parameters stored on the tag. Upon receiving a subsequent command (which may be the run command received in step 1610) or upon a trigger event (such as those described above in relation to FIG. 12) in step 1540, the tag executes the program(s) at step 1560. In certain embodiments, the program(s) may be modified at optional step 1550 based on parameters included in the run command or stored on the tag prior to program execution. The modification of the program(s) may include, but is not limited to, an order of execution, a parameter of each program, a handling of generated result, and the like. After executing the program(s) at step 1560, the tag may encrypt any results of the program execution at optional step 1570 and store or transmit the results. At optional step 1580, the tag may modify one or more of its behaviors based on the result(s) of the program execution. For example, the tag may determine whether to participate in a subsequent inventory round, modify a behavior during a subsequent inventory round, or store a result in a tag memory. Finally, at step 1590, the tag receives a Query or Query-like command from a reader that initiates an inventory round (which can be the "subsequent inventory round" referenced above) and/or singulates the tag. The tag receives the Query/Query-like command after the run command is received (step 1510), but in other embodiments may receive the Query/Query-like command before it receives a subsequent command or trigger event (step 1540).

Figure 16:
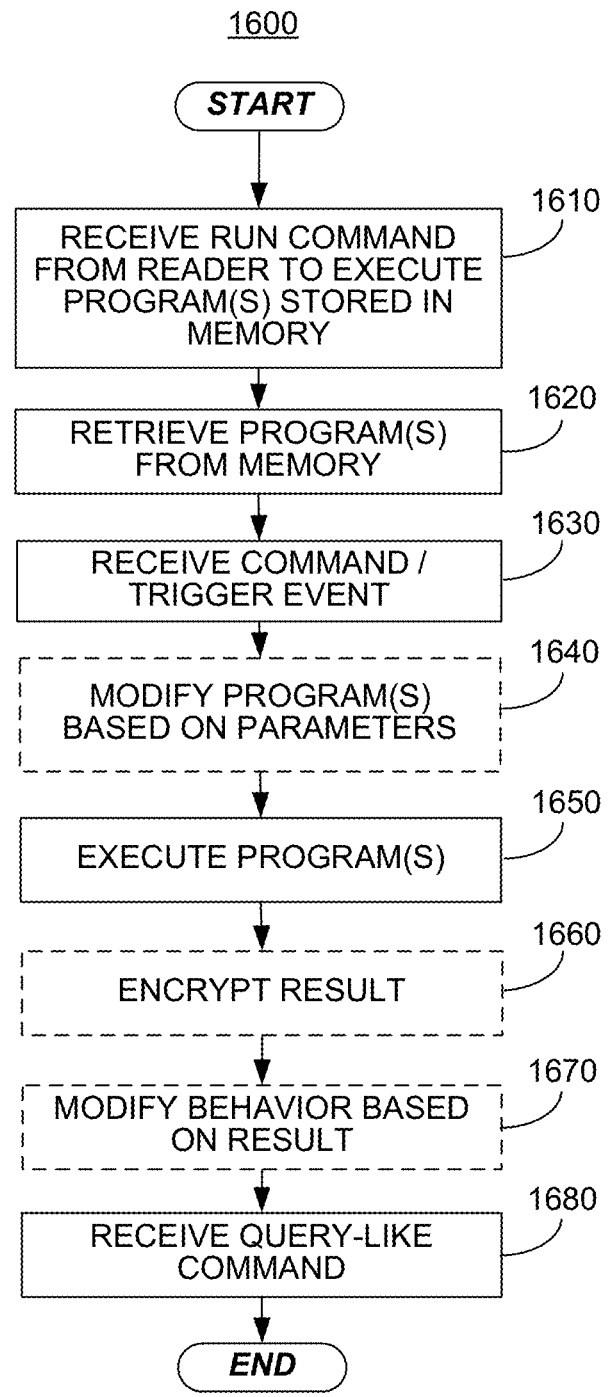
FIG. 16 is a flowchart illustrating an example method of tag execution of a run command specifying program(s) stored in tag memory according to embodiments.

FIG. 16 depicts an example method of tag execution of program(s) stored in tag memory according to some embodiments. The method begins with step 1610, in which the tag, prior to singulation, receives a run command specifying one or more programs stored in tag memory to be executed. The run command may include a listing of memory locations for the programs in its payload, indicate the programs by name, or specify the programs in any similar manner. For example, the run command may include the location of the first program and a number of successive programs, if the programs are stored successively in tag memory. In some embodiments, the tag may authenticate the received run command before proceeding further. The tag may or may not transmit a reply to the reader in response to receiving the run command.

The tag (or a processor of the tag) retrieves the indicated program(s) from tag memory at step 1620 and, upon receiving a subsequent command (which may be the run command received in step 1610) or upon a trigger event (as described above) in step 1630, executes the retrieved program(s) at step 1650. Optionally, the stored program(s) may be modified at optional step 1640 based on parameters included in the run command or stored on the tag prior to the stored programs being executed. The modification of the stored program(s) may include, but is not limited to, an order of execution, a parameter of each program, a handling of generated result, and the like. After the execution of the program(s) in step 1650, the tag may optionally encrypt any results of the program execution at optional step 1660 and store or transmit the results. At optional step 1670, the tag may modify one or more of its behaviors based on a result of the executed program or programs. For example, the tag may determine whether to participate in a subsequent inventory round, modify a behavior during a subsequent inventory round, or store a result in a tag memory. Finally, at step 1680, the tag receives a Query or Query-like command from a reader that initiates an inventory round (which can be the "subsequent inventory round" referenced above) and/or singulates the tag. The tag receives the Query/Query-like command after the run command is received (step 1610), but in other embodiments may receive the Query/Query-like command before it receives a subsequent command or trigger event (step 1630).

The operations described in processes 1300, 1500, and 1600 are for illustrative purposes only. RFID tags may store instructions for subsequent execution, execute instructions received from a reader in an encapsulating command, execute programs received in a run command, and/or execute one or multiple programs in response to receiving an indication of the programs stored in tag memory employing additional or fewer operations and in different orders using the principles described herein. Of course an order of the operations may be modified, some operations eliminated, or other operations added according to other embodiments.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

We claim:

1. A method for a Radio Frequency Identification (RFID) tag, comprising:
   receiving an encapsulating command from a reader, the encapsulating command including:
   an encapsulating command code; and
   a payload including:
   a first command code; and
   a first instruction associated with the first command code and configured to cause the tag to perform a first action.

2. The method of claim 1, wherein the encapsulating command further includes:
   a preamble associated with the encapsulating command; and
   an error-check code associated with the encapsulating command.

3. The method of claim 1, wherein the encapsulating command further includes:
   a second command code; and
   a second instruction associated with the second command code and configured to cause the tag to perform a second action.

4. The method of claim 1, further comprising not transmitting a reply in response to receiving the encapsulating command.

5. The method of claim 1, wherein the encapsulating command further includes a parameter related to the first action.

6. The method of claim 5, wherein the parameter specifies an order in which to execute the first instruction relative to an execution of another instruction.

7. The method of claim 1, further comprising:
   based at least in part on a result of the first action, at least one of:
   determining whether to participate in a subsequent inventory round;
   modifying a behavior during a subsequent inventory round; and
   storing the result in a tag memory.

8. The method of claim 1, further comprising:
   executing the first instruction in response to a trigger event selected from:
   receiving the encapsulating command;
   receiving a subsequent command;
   a tag power condition;
   a tag timer expiration; and
   a tag sensor input.

9. The method of claim 1, further comprising:
   storing the first instruction in a tag memory in response to the encapsulating command.

10. The method of claim 1, wherein the encapsulating command is a Select command of the Gen2 Specification.

11. The method of claim 1, wherein the encapsulating command is received prior to receiving a singulating command from the reader.

12. The method of claim 11, wherein the singulating command is a Query/Query-like command.

13. The method of claim 1, wherein the first instruction is at least one from a set of:
   encrypted;
   electronically signed;
   combined with a message count; and
   combined with a message authentication code.

14. A Radio Frequency Identification (RFID) tag, comprising
   a processing block configured to:
   receive an encapsulating command from a reader, the encapsulating command including:
   an encapsulating command code; and
   a payload including:
   a first command code; and
   a first instruction associated with the first command code and configured to cause the tag to perform a first action.

15. The tag of claim 14, wherein the encapsulating command further includes:
   a preamble associated with the encapsulating command; and
   an error-check code associated with the encapsulating command.

16. The tag of claim 14, wherein the encapsulating command further includes:
   a second command code; and
   a second instruction associated with the second command code and configured to cause the tag to perform a second action.

17. The tag of claim 14, wherein the processing block is further configured to not transmit a reply in response to receiving the encapsulating command.

18. The tag of claim 14, wherein the encapsulating command further includes a parameter related to the first action.

19. The tag of claim 18, wherein the parameter specifies an order in which to execute the first instruction relative to an execution of another instruction.

20. The tag of claim 14, further comprising a tag memory, wherein the processing block is further configured to:
   based at least in part on a result of the first action, perform at least one of:
   determine whether to participate in a subsequent inventory round;
   modify a behavior during a subsequent inventory round; and
   store the result in the tag memory.

21. The tag of claim 14, wherein the processing block is further configured to:
   execute the first instruction in response to a trigger event selected from:
   receiving the encapsulated command;
   receiving a subsequent command;
   a tag power condition;
   a tag timer expiration; and
   a tag sensor input.

22. The tag of claim 14, further comprising a tag memory, wherein the processing block is further configured to:
   store the first instruction in a tag memory location in response to the encapsulating command.

23. The tag of claim 14, wherein the encapsulating command is a Select command of the Gen2 Specification.

24. The tag of claim 14, wherein the encapsulating command is received prior to receiving a singulating command from the reader.

25. The tag of claim 24, wherein the singulating command is a Query/Query-like command.

26. The tag of claim 14, wherein the first instruction is at least one of:
- encrypted;
- electronically signed;
- combined with a message count; and
- combined with a message authentication code.

27. A method for a Radio Frequency Identification (RFID) tag, comprising:
- receiving an encapsulating command from a reader, the encapsulating command including:
  - an encapsulating command code; and
  - a payload including:
    - a first command code; and
    - a first instruction associated with the first command code and configured to cause the tag to perform a first action; and
- performing at least one of:
  - decrypting the first instruction, and
  - encrypting a result of the first action.

\* \* \* \* \*

UNITED STATES PATENT AND TRADEMARK OFFICE
CERTIFICATE OF CORRECTION

PATENT NO. : 8,669,872 B1  Page 1 of 1
APPLICATION NO. : 13/164578
DATED : March 11, 2014
INVENTOR(S) : Stanford et al.

It is certified that error appears in the above-identified patent and that said Letters Patent is hereby corrected as shown below:

Title page, item [60]

In Column 1, Line 3-4, Delete "Jun. 20, 2010." and insert -- Jun. 22, 2010. --, therefor.

Signed and Sealed this
Seventh Day of April, 2015

Michelle K. Lee
*Director of the United States Patent and Trademark Office*